US008147094B2

(12) United States Patent
Chiang et al.

(10) Patent No.: US 8,147,094 B2
(45) Date of Patent: Apr. 3, 2012

(54) ILLUMINATION SYSTEM

(75) Inventors: Ya-Hui Chiang, Taoyuan (TW); Cheng-Da Shaw, Taipei (TW); Hung-Lieh Hu, Hsinchu (TW); Kuan-Chieh Tu, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 166 days.

(21) Appl. No.: 12/405,172

(22) Filed: Mar. 16, 2009

(65) Prior Publication Data

US 2010/0097795 A1 Apr. 22, 2010

(30) Foreign Application Priority Data

Oct. 17, 2008 (TW) ............................... 97139878 A

(51) Int. Cl.
*B60Q 1/26* (2006.01)

(52) U.S. Cl. ........ 362/232; 362/804; 362/238; 362/277; 362/296.01; 362/346; 362/514; 362/1

(58) Field of Classification Search .................. 362/232, 362/238, 277, 282, 306, 346, 296.01, 297, 362/298, 514, 517, 518, 285, 302, 303, 572, 362/804
See application file for complete search history.

(56) References Cited

U.S. PATENT DOCUMENTS 3,911,267 A * 10/1975 Kiehn ........................... 362/282
4,617,619 A * 10/1986 Gehly ........................... 362/302
5,178,452 A * 1/1993 Scholz .......................... 362/319
5,331,530 A * 7/1994 Scholz .......................... 362/293
5,765,943 A * 6/1998 Verdier ......................... 362/268
5,951,139 A * 9/1999 Smith et al. ...................... 362/33
6,328,458 B1 * 12/2001 Bell et al. ...................... 362/371
6,572,234 B1 * 6/2003 Maier et al. ..................... 362/20
7,794,128 B2 * 9/2010 Fujiwara et al. .............. 362/545
2003/0210559 A1 * 11/2003 Jesurun et al. ................ 362/572
2007/0041167 A1 * 2/2007 Nachi ............................. 362/33
2010/0194276 A1 * 8/2010 Okubo et al. .................. 315/82

FOREIGN PATENT DOCUMENTS

CN 1862080 A 11/2006
TW 351420 1/1999
TW 200536150 11/2005
TW I270628 1/2007

OTHER PUBLICATIONS

China Patent Office, Office Action, Patent Application Serial No. 200810171061.9, Apr. 19, 2011, China.
Taiwan Patent Office, Office Action, Patent Application Serial No. 097139878, Dec. 14, 2011, Taiwan.

* cited by examiner

*Primary Examiner* — Evan Dzierzynski

(57) ABSTRACT

An illumination system is provided, including a plurality of first illumination units, a plurality of second illumination units, a projecting adjusting module and a focus adjusting module. The projecting adjusting module is connected to the first illumination units to adjust the projection pattern. The focus adjusting module is connected to the first and second illumination units to adjust the focus position of the illumination units.

18 Claims, 9 Drawing Sheets

120

ILLUMINATION SYSTEM

CROSS REFERENCE TO RELATED APPLICATIONS

This Application claims priority of Taiwan Patent Application No. 97139878, filed on Oct. 17, 2008, the entirety of which is incorporated by reference herein.

BACKGROUND OF THE INVENTION

1. Field of the Invention

The present invention relates to an illumination system, and in particular relates to an illumination system with multiple light sources.

2. Description of the Related Art

A conventional lamp comprises a large reflector and light sources disposed on the reflector. The large reflector comprises a plurality of small mirrors reflect the light from the light sources to generate a projection pattern without shadows. The position of focus is changed by moving the light sources up and down.

BRIEF SUMMARY OF INVENTION

An embodiment of an illumination system of the invention comprises a first illumination module and a second illumination module. The first illumination module comprises a plurality of first illumination units corresponding to an axis, wherein each first illumination unit comprising at least one first light source, at least one first reflector and at least one third reflector. Light beams from the first light source are reflected by the first reflector and/or the third reflector to generate a first projection pattern, and the light beams are concentrated on a first focus located on the axis. The first projection pattern is changed by changing the distance from the first reflector to the first light source, and the position of the first focus is changed by changing the angle between the first illumination unit and the axis. The second illumination module comprises a plurality of second illumination units corresponding to the axis, wherein each second illumination unit comprises at least one second light source, at least one second reflector and at least one fourth reflector. Light beams from the second light source are reflected by the second reflector and/or the fourth reflector to generate a second projection pattern combined with the first projection pattern to form a projection pattern. The light beams are concentrated on a second focus located on the axis. The position of the second focus is changed by changing the angle between the second illumination unit and the axis.

A detailed description is given in the following embodiments with reference to the accompanying drawings.

BRIEF DESCRIPTION OF DRAWINGS

The present invention can be more fully understood by reading the subsequent detailed description and examples with references made to the accompanying drawings, wherein.

DETAILED DESCRIPTION OF INVENTION

Figure 1:
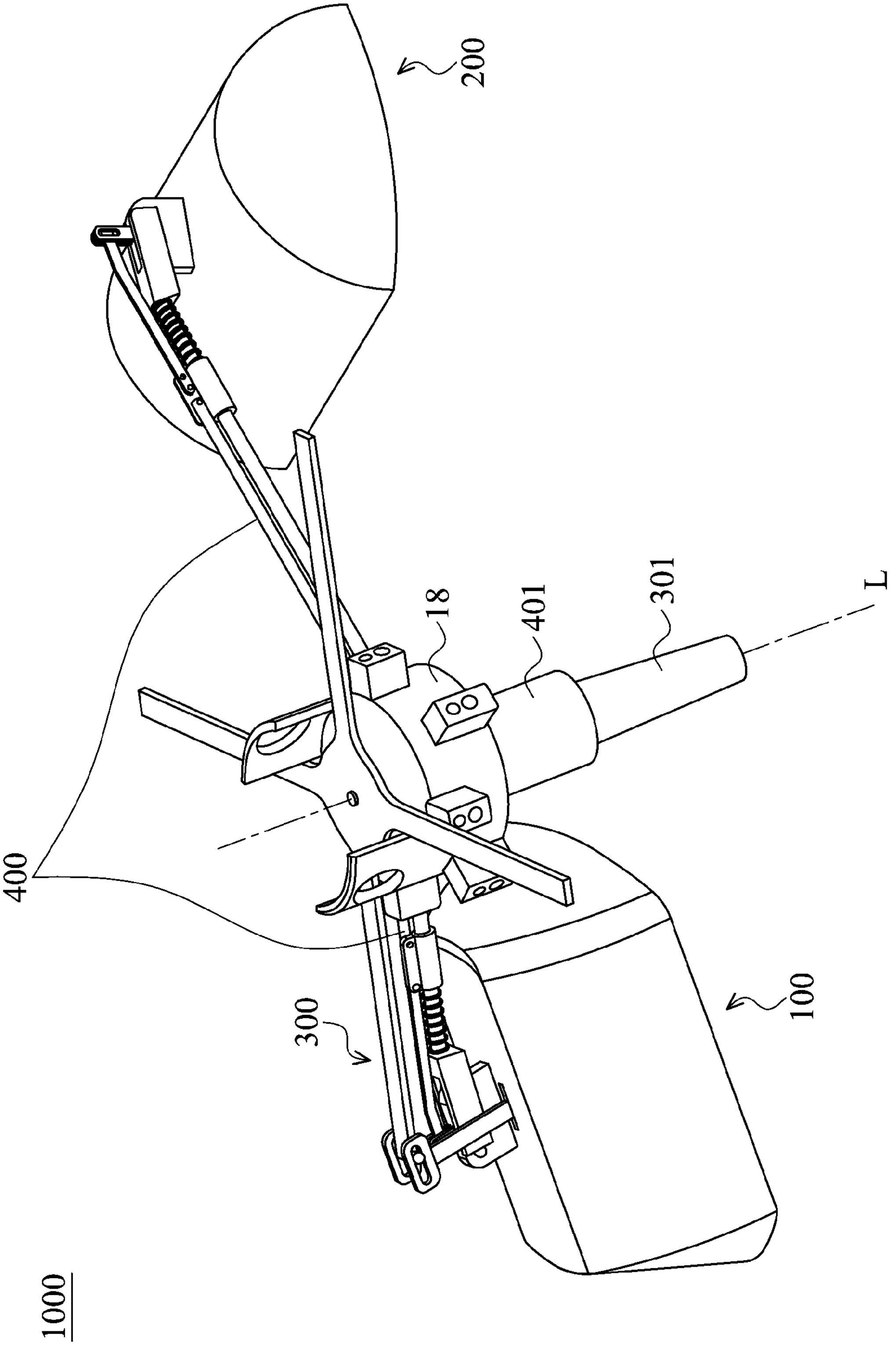
FIG. 1 is a perspective view of an embodiment of an illumination system of the invention.

Referring to FIG. 1, an illumination system 1000 of the invention comprises a first illumination module 100, a second illumination module 200, a projection adjusting module 300 and a focus adjusting module 400.

Figure 2A:
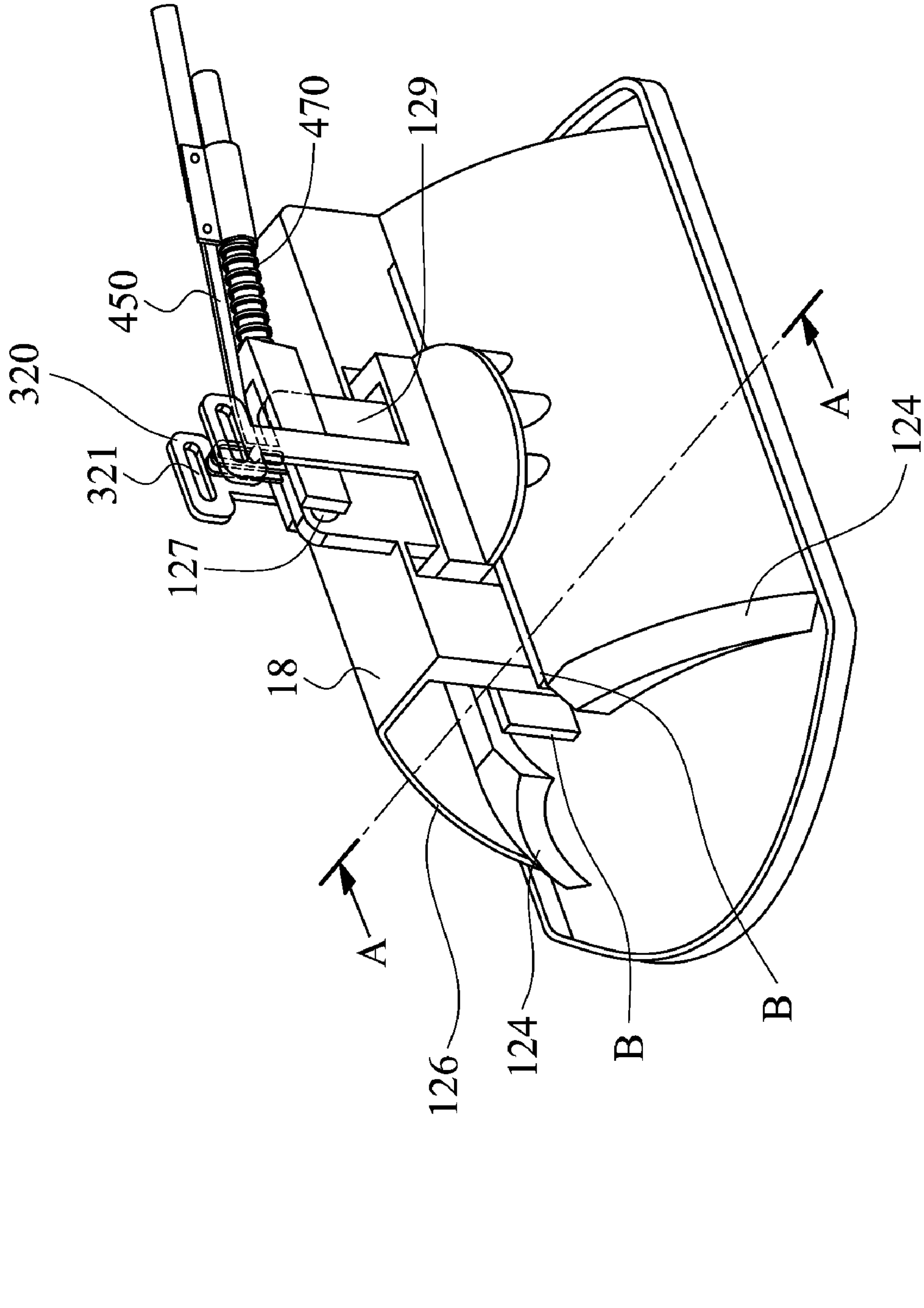
FIG. 2*a* is a perspective view of an embodiment of a first illumination unit of the invention.
Figure 2B:
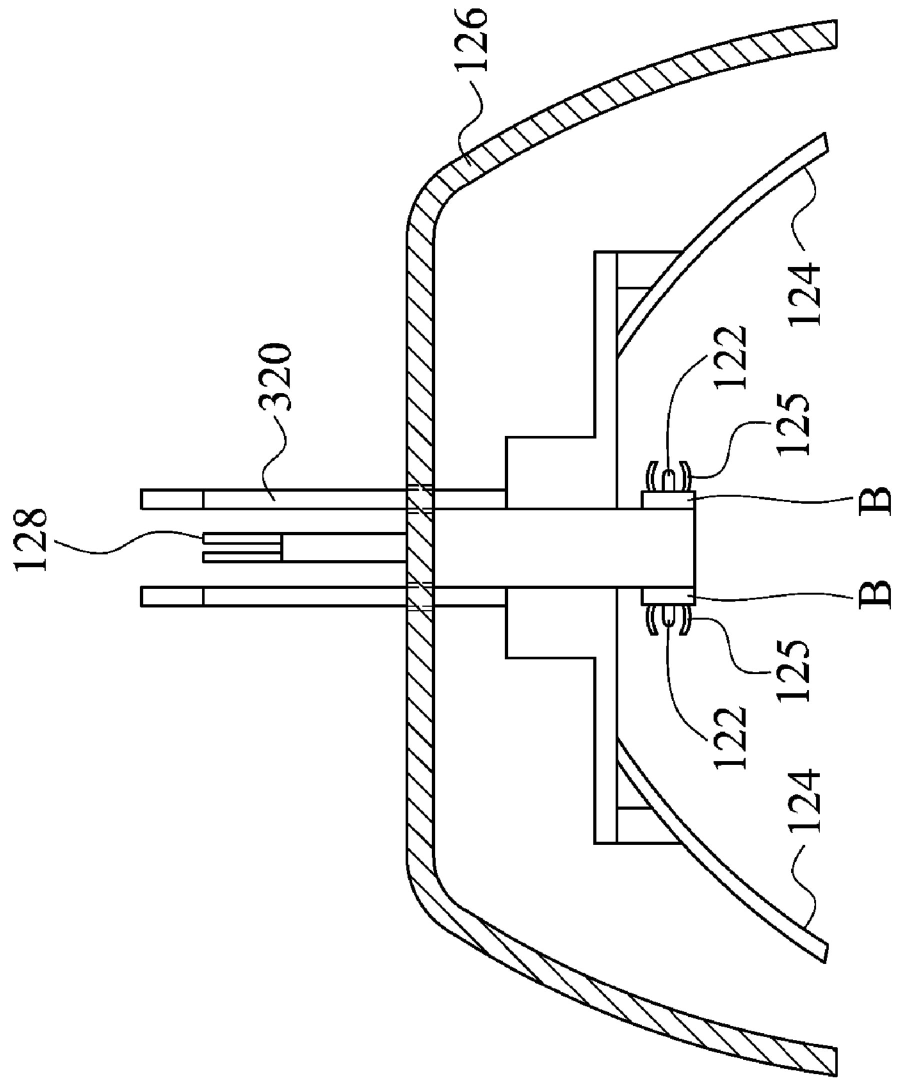
FIG. 2*b* is a cross section along the A-A line of FIG. 2*a;*

The first illumination module 100 comprises a plurality of first illumination units 120 (for the sake of clarity, only one first illumination unit is shown) corresponding to an axis L. In this embodiment, the first illumination units 120 surround the axis L and are equally distanced from the axis L. Each first illumination unit 120, shown in FIGS. 2*a* and 2*b*, comprises a plurality of first light sources 122, a plurality of first reflectors 124, a plurality of third reflectors 125 and a first shield 126. The first reflector 124 is disposed on a connecting element 320, and the first light source 122 is joined to the first shield 126 via an installation plate B on which the third reflector 125 is disposed. The third reflector 125 is near the first light source 122. Light from the first light source 122 is reflected by the first reflector 124 and/or the third reflector 125 to generate a projection pattern.

Figure 3:
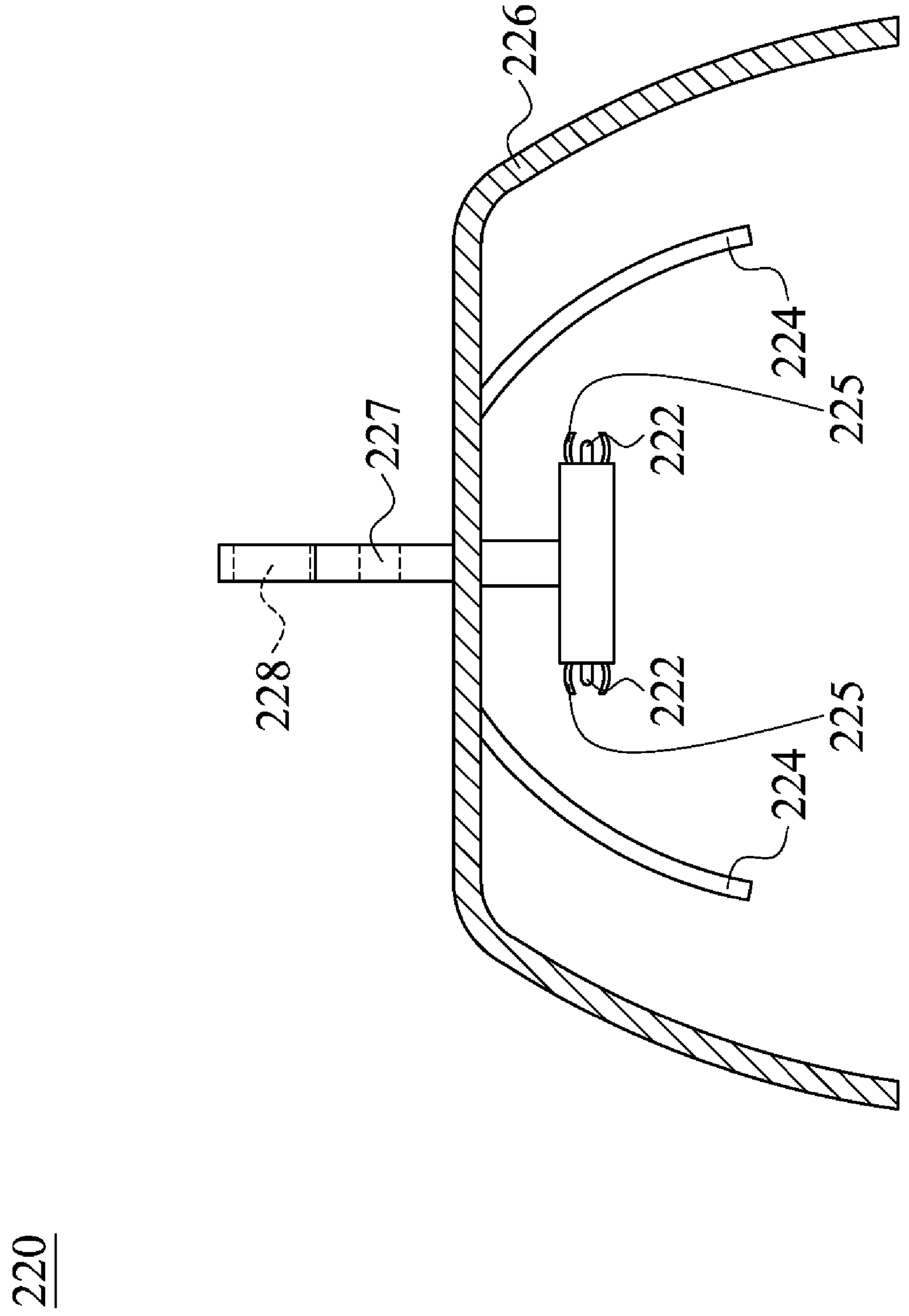
FIG. 3 is a cross section of a second illumination unit of the invention.

The second illumination module 200 comprises a plurality of second illumination units 220 (for the sake of clarity, only one second illumination unit is shown) corresponding to the axis L. In this embodiment, the second illumination units 220 surround the axis L and are equally distanced from the axis L. Each second illumination unit 220, as shown in FIG. 3, comprises a plurality of second light sources 222, a plurality of second reflectors 224, a plurality of fourth reflectors 225 and a second shield 226. The second light source 222, the second reflector 224 and the fourth reflector 225 are disposed on the second shield 226.

To adjust the projection pattern, the projection adjusting module 300 is joined to the first illumination module 100 to change the distance from the first reflector 124 to the first light source 122, whereby the projection pattern is changed.

To adjust focus position of the light, the focus adjusting module 400 is joined to the first illumination module 100 and the second illumination unit module 200 to change the angle of the first illumination unit 120 and the axis L or/and the angle of the second illumination unit 220 and the axis L so as to change the focus position (first focus) of the first illumination units 120 or/and the focus position (second focus) of the second illumination units 220.

As described above, the illumination system 1000 changes the projection pattern via the projection adjusting module 300 and the focus position via the focus adjusting module 400.

Figure 4A:
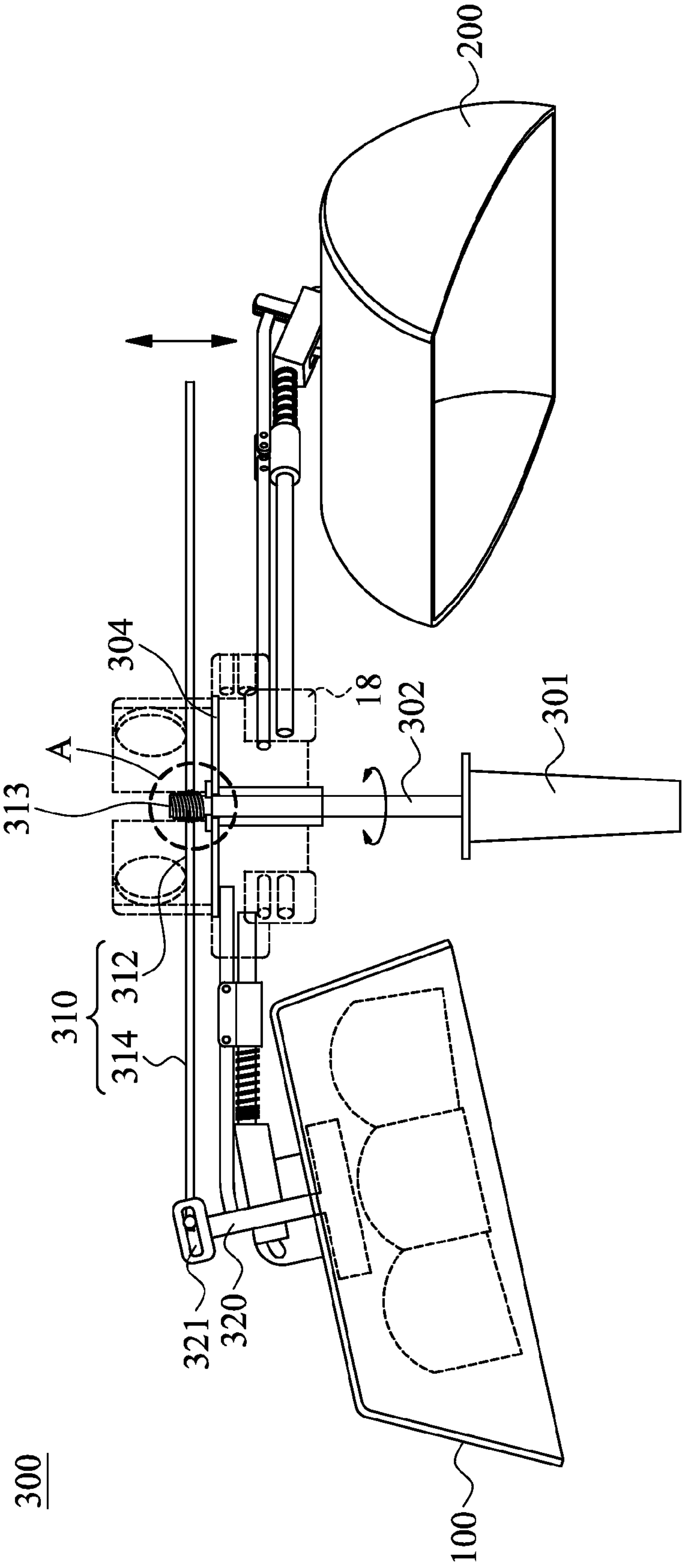
FIG. 4*a* is a side view of a projection adjusting module of the invention.
Figure 4B:
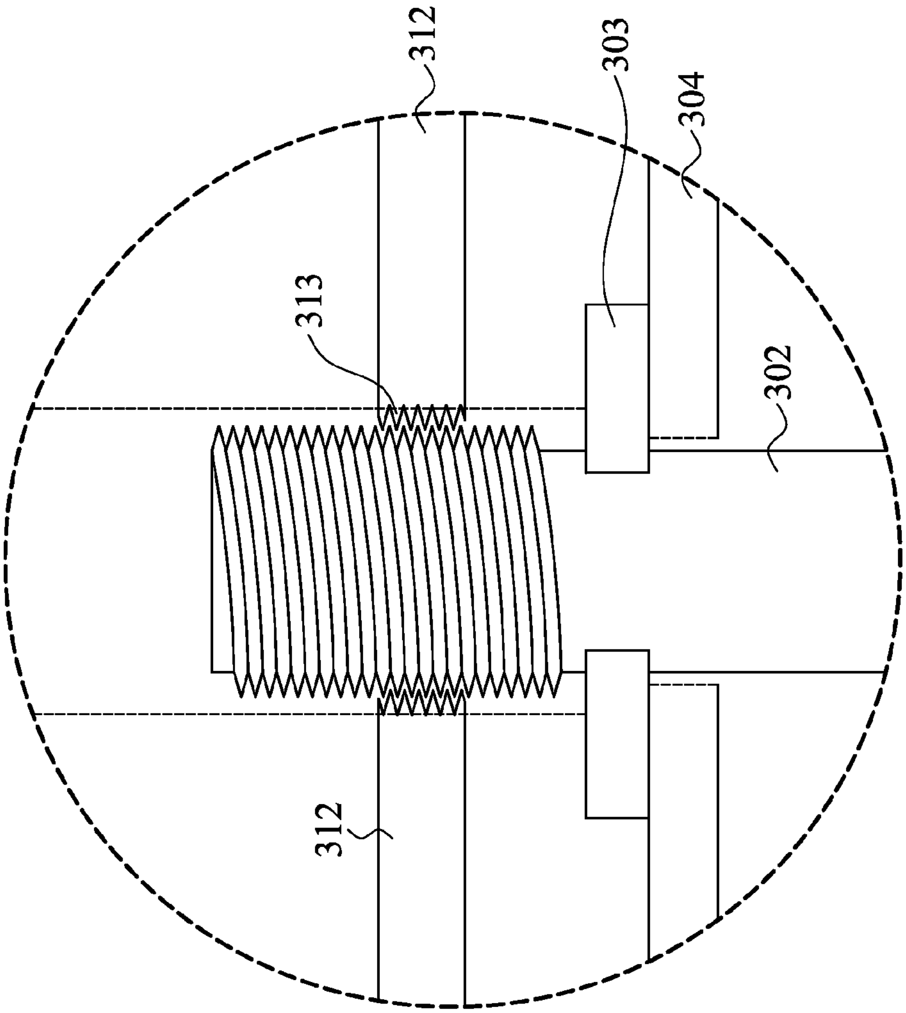
FIG. 4*b* is an enlarged view of the A portion of FIG. 4*a;*
Figure 5:
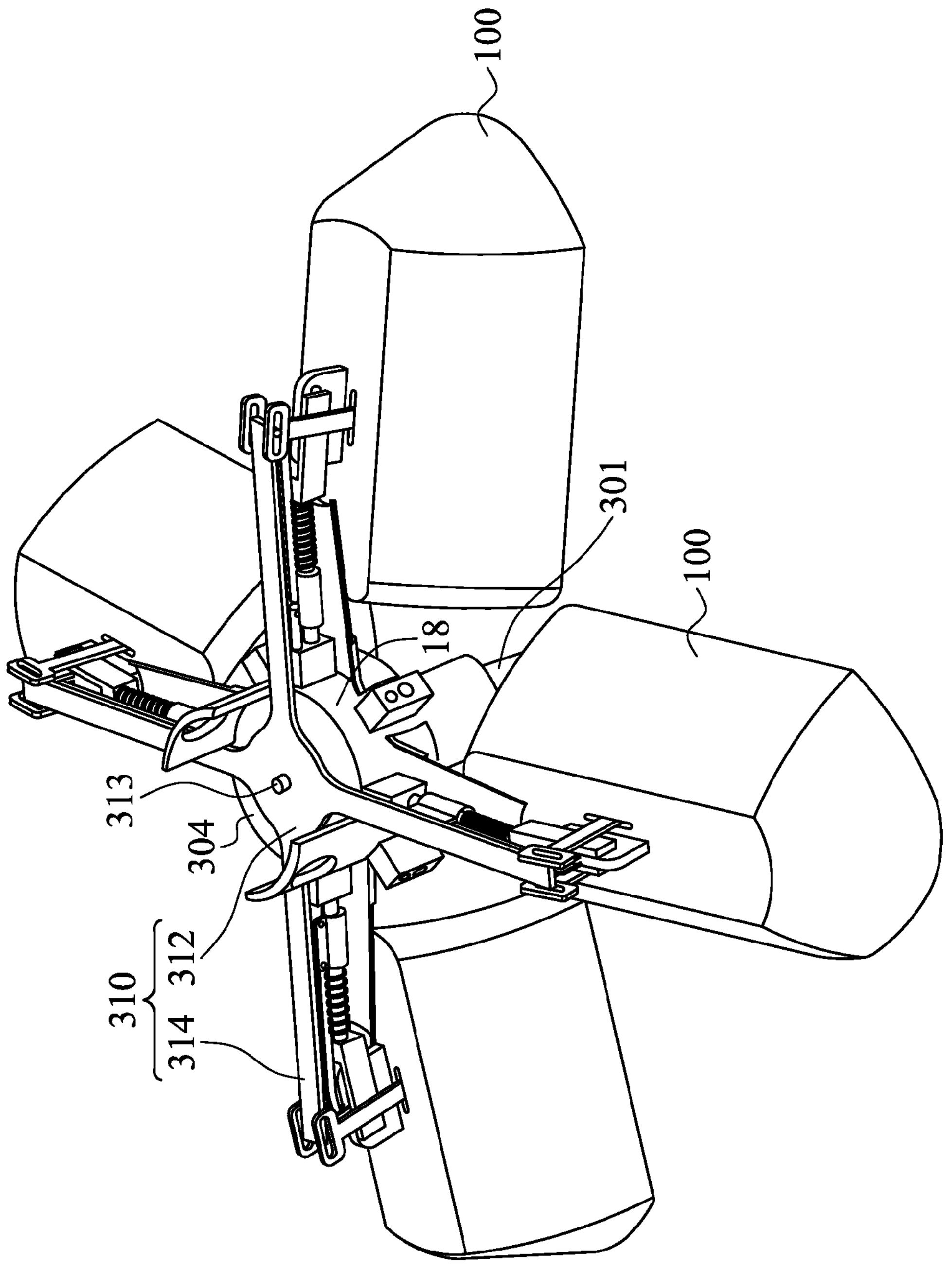
FIG. 5 is a schematic view of a projection adjusting module of the invention.

The projection adjusting module 300, as shown in FIG. 4*a*, comprises an adjusting handle 301, a lifting shaft 302, a fixing plate 304, a lifting element 310 and a connecting element 320. The adjusting handle 301 is connected to the lifting shaft 302 located on the axis L. The lifting shaft 302 is positioned on the fixing plate 304 by a C clamp 303 (as shown in FIG. 4*b*). The fixing plate 304 is fixed to the housing 18. A male screw thread is formed on the end of the lifting shaft 302. Referring to FIG. 5, the lifting element 310 comprises a central portion 312 and a plurality of lifting rods 314 extending from the central portion 312. The central portion 312 comprises a central hole 313 on which a female screw thread is formed. The lifting shaft 302 is joined to the central hole 313 by the male screw thread engaging the female screw thread, as shown in FIG. 4*b*. The end of the lifting rods 314 engages a groove 321 of the connecting element 320 as shown in FIG. 4*a*. When the adjusting handle 301 is rotated, the lifting shaft 302 rotates to move the lifting element 310, whereby the lifting rods 314 move up and down to move the connecting element 320 up and down. As the connecting element 320 engages a sliding shaft 129 (see FIG. 2*a*) and the first reflector 124 is disposed on the connecting element 320, the first reflector 124 moves up and down to change the distance from the first light source 122 and the first reflector 124 so as to change the projection pattern.

Figure 6:
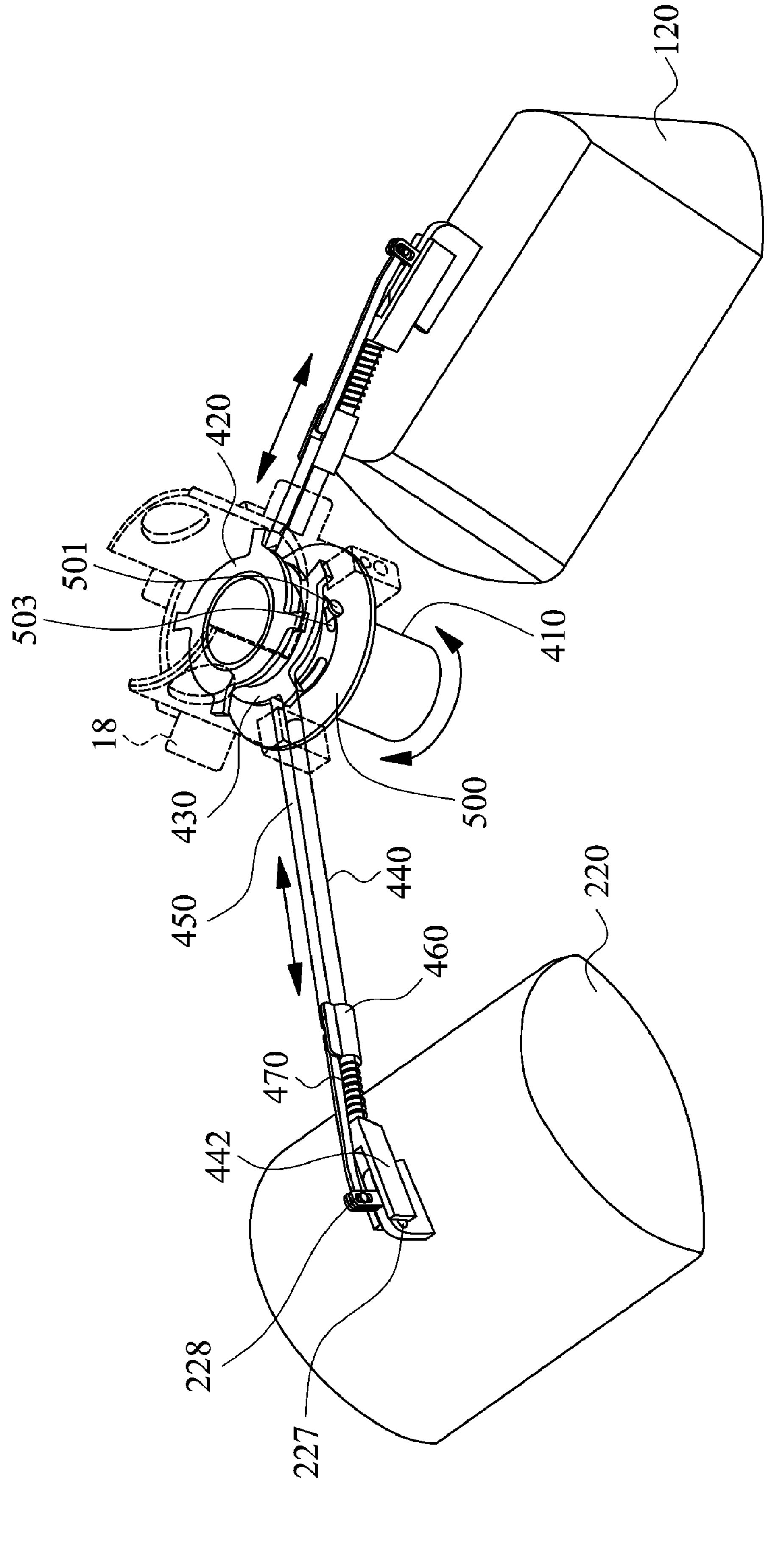
FIG. 6 is a schematic view of a focus adjusting module of the invention.

FIG. 6 depicts the structure of a focus adjusting module 400. The focus adjusting module 400 comprises a rotating cylinder 410, a first cam 420, a second cam 430, a plurality of rods 440 (there are 8 rods 440 in this embodiment, four rods for the first illumination module 100, and the other four rods for the second illumination module 200), a plurality of push rods 450 (there are 8 push rods 450 in this embodiment, four rods for the first illumination module 100, and the other four rods for the second illumination module 200), a plurality of blocks 460 (there are 8 blocks 460 in this embodiment), and a plurality of springs 470 (there are 8 springs 470 in this embodiment which are elastic elements).

The rotating cylinder 410 rotates about the axis L. The first cam 420 and the second cam 430 are formed on the periphery of the rotating cylinder 410 corresponding to the first illumination module 100 and the second illumination module 200. One end of the push rods 450 abuts the first cam 420 and the second cam 430 respectively, and the other end of the push rods 450 engages a longitudinal groove 128 on the first shield 126 or a longitudinal groove 228 on the second shield 226 (see FIGS. 2*a*, 2*b* and 3). One end of the rods 440 is fixed to the housing 18. The blocks 460 slide on the rods 440. A connecting portion 442 is disposed on the other end of the rods 440. The connecting portion 442 engages the traverse groove 127 on the first shield 126 or the traverse groove 227 on the second shield 226 (see FIGS. 2*a* and 3). The springs 470 are disposed between biases of the blocks 460, whereby one end of the rods 450 is maintained to abut the first cam 420 or the second cam 430.

When the rotating cylinder 410 rotates, the first cam 420 and the second cam 430 rotates, whereby the push rods 450 are moved forth and back. The other end of the push rod 450 pushes the lateral edge of the longitudinal grooves 128 and 228 to open or close the first shield 126 and the second shield 226. As the traverse grooves 127, 227 are curved, the first shield 126 and the second shield 226 can slide smoothly.

An annular constraining element 500 is disposed on an inner side of the housing 18. A curved groove 503 is formed on the constraining element 500. A constraining pin 501 is connected to the rotating cylinder 410. The constraining pin 501 slidably engages the groove 503. When the rotating cylinder 410 rotates, the constraining pin 501 abuts the edge of the groove 503 to constrain the rotation of the rotating cylinder 410.

Figure 7:
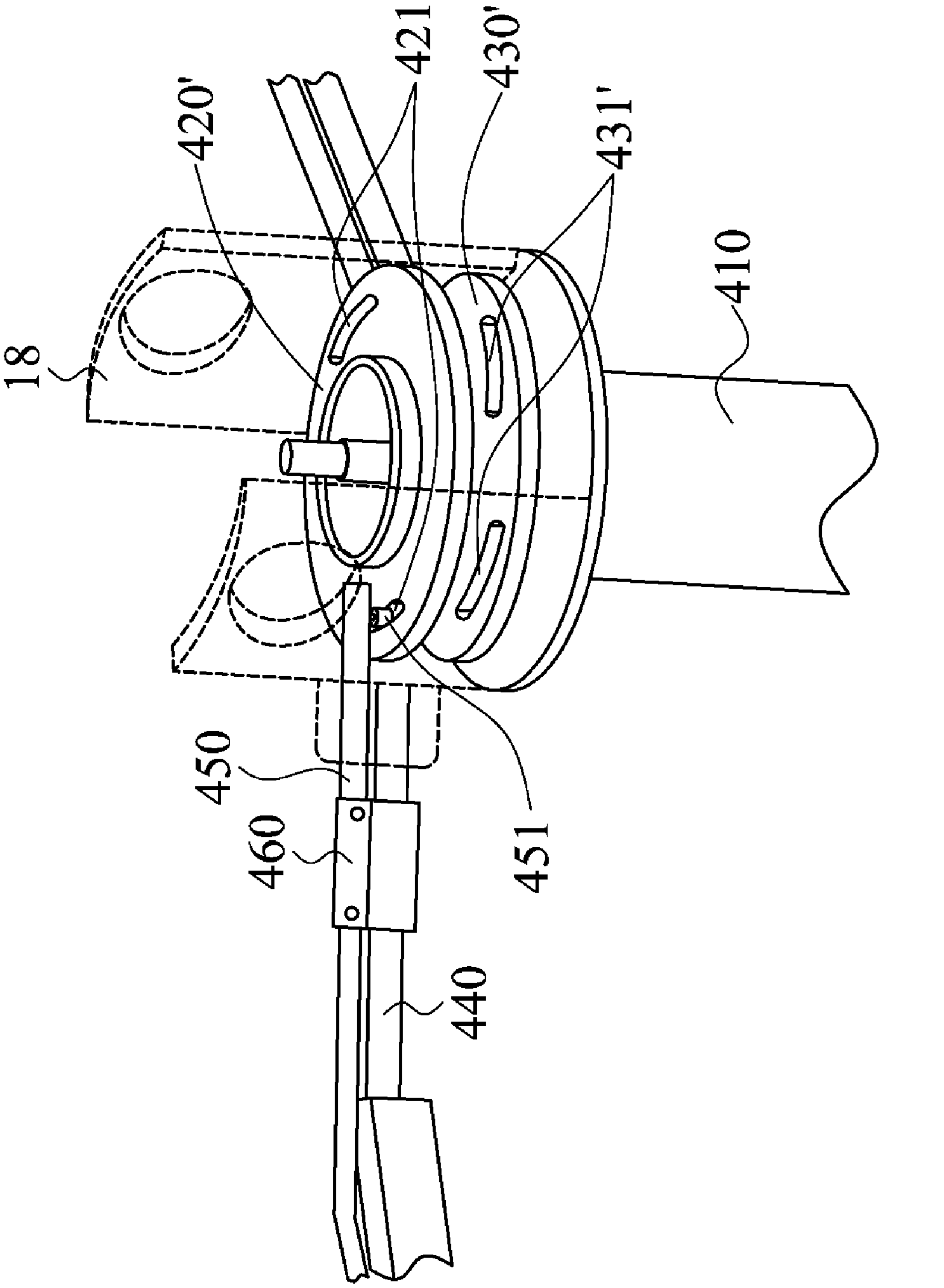
FIG. 7 depicts the engagement of a cam and a push rod in a focus adjusting module.

FIG. 7 depicts a partially enlarged view of another embodiment of the illumination system of the invention. The structures of the first cam 420' and the second cam 430' in this embodiment are different from the first cam 420 and the second cam 430 in FIGS. 1~6.

The first cam 420' has a plurality of first groove 421', and the second cam 430' has a plurality of second grooves 431'. A guide element 451 is disposed on one end of the push rod 450. The guide element 451 engages the first and second grooves 421' and 431'. When the first cam 420' and the second cam 430' rotates, the guide element 451 can slide in the first and second grooves 421' and 431'. As the first and second grooves 421' and 431' are inclined, when the first and second cams 420' and 430' rotate, the push rods 450 is moved. In this embodiment, as the push rods 450 are joined to the first cam 420' and the second cam 430' via the guide element 451, the spring 470 is eliminated.

While the invention has been described by way of example and in terms of embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An illumination system, comprising:

a first illumination module comprising a plurality of first illumination units corresponding to an axis, wherein each first illumination unit comprises at least one first light source, at least one first reflector and at least one third reflector, arranged such that light beams from the first light source are reflected by the first reflector and/or the third reflector to generate a first projection pattern, and the light beams are concentrated on a first focus located on the axis, the first projection pattern is changed by changing the distance from the first reflector to the first light source by movement of the first reflector, and the position of the first focus is changed by changing the angle between the first illumination unit and the axis;

a second illumination module comprising a plurality of second illumination units corresponding to the axis, wherein each second illumination unit comprises at least one second light source, at least one second reflector and at least one fourth reflector, and wherein light beams from the second light source are reflected by the second reflector and/or the fourth reflector to generate a second projection pattern combined with the first projection pattern to form a projection pattern, the light beams are concentrated on a second focus located on the axis, the position of the second focus is changed by changing the angle between the second illumination unit and the axis; and a projection adjusting module joined to the first illumination units and changing the distance from the first reflector to the first light source to change the projection pattern, wherein the projection adjusting module comprises:

a lifting shaft located on the axis; and a lifting element joined to the lifting shaft and the first reflector, wherein when the lifting shaft rotates, the lifting element moves linearly and moves the first reflector to change the distance from the first reflector to the first light source.

2. The illumination system as claimed in claim 1, wherein the lifting element has a female screw thread, and the lifting shaft has a male screw thread, and the projection adjusting module has a cover on which the lifting shaft is positioned, and wherein the male screw thread is maintained to engage the female screw thread, and the lifting shaft rotates to move the lifting element linearly.

3. The illumination system as claimed in claim 1, wherein the lifting element has a central portion and a plurality of lifting rods extending from the central portion and joined to the first reflector.

4. The illumination system as claimed in claim 1, wherein the projection adjusting module further comprises a plurality of connecting elements connecting the lifting shaft and the first reflector.

5. The illumination system as claimed in claim 1 further comprising a focus adjusting module joined to the first illumination units and the second illumination units and changing the angle between the first illumination units and the axis and the angle between the second illumination units and the axis, whereby the positions of the first focus and the second focus are changed, wherein the focus adjusting module comprises:

a rotating cylinder rotating about the axis;

a first cam formed on the periphery of the rotating cylinder and corresponding to the first illumination units;

a second cam formed on the periphery of the rotating cylinder and corresponding to the second illumination units; and a plurality of push rods with one end abutting or engaging with the first cam or the second cam and the other end joined to the first illumination unit or the second illumination unit, wherein when the rotating cylinder rotates, the first cam and the second cam rotates to move the push rods so as to change the angle of the first illumination unit and the axis and the angle of the second illumination unit and the axis; and a housing surrounding the projection adjusting module and the focus adjusting module.

6. The illumination system as claimed in claim 5, wherein the projection adjusting module comprises:

a plurality of rods with one end fixed to the housing;

a plurality of blocks fixed to the push rods and sliding on the rods; and a plurality of elastic elements disposed on the rods to bias the blocks, whereby the push rods are maintained to abut or engage with the first cam and the second cam.

7. The illumination system as claimed in claim 6, wherein the first illumination unit further comprises a first shield covering the first reflector, the third reflector and the first light source disposed on the first shield, and the second illumination unit further comprises a second shield covering the second reflector, the fourth reflector and the second light source, and wherein the second reflector and the second light source are disposed on the second shield.

8. The illumination system as claimed in claim 7, wherein the second shield comprises a longitudinal groove and a traverse groove, and the other end of the push rod slidably engages the longitudinal groove, and the other end of the rod slidably engages the traverse groove, and wherein the longitudinal groove is perpendicular to the movement of the push rod.

9. The illumination system as claimed in claim 8, wherein the traverse groove is curved, and when the push rod moves to push the edge of the longitudinal groove, the second shield is moved by the engagement of the rod and the traverse groove so as to change the distance of the second illumination unit and the axis.

10. The illumination system as claimed in claim 7, wherein the first shield comprises a longitudinal groove and a traverse groove, and the other end of the push rod slidably engages the longitudinal groove, and the other end of the rod slidably engages the traverse groove, and wherein the longitudinal groove is perpendicular to the movement of the push rod.

11. The illumination system as claimed in claim 10, wherein the traverse groove is curved, and when the push rod moves to push the edge of the longitudinal groove, the second shield is moved by the engagement of the rod and the traverse groove so as to change the distance of the first illumination unit and the axis.

12. An illumination system, comprising:

a first illumination module comprising a plurality of first illumination units corresponding to an axis, wherein each first illumination unit comprises at least one first light source, at least one first reflector and at least one third reflector, arranged such that light beams from the first light source are reflected by the first reflector and/or the third reflector to generate a first projection pattern, and the light beams are concentrated on a first focus located on the axis, the first projection pattern is changed by changing the distance from the first reflector to the first light source by movement of the first reflector, and the position of the first focus is changed by changing the angle between the first illumination unit and the axis;

a second illumination module comprising a plurality of second illumination units corresponding to the axis, wherein each second illumination unit comprises at least one second light source, at least one second reflector and at least one fourth reflector, and wherein light beams from the second light source are reflected by the second reflector and/or the fourth reflector to generate a second projection pattern combined with the first projection pattern to form a projection pattern, the light beams are concentrated on a second focus located on the axis, the position of the second focus is changed by changing the angle between the second illumination unit and the axis; and a focus adjusting module joined to the first illumination units and the second illumination units and changing the angle between the first illumination units and the axis and the angle between the second illumination units and the axis, whereby the positions of the first focus and the second focus are changed, wherein the focus adjusting module comprises:

a rotating cylinder rotating about the axis;

a first cam formed on the periphery of the rotating cylinder and corresponding to the first illumination units;

a second cam formed on the periphery of the rotating cylinder and corresponding to the second illumination units; and a plurality of push rods with one end abutting or engaging with the first cam or the second cam and the other end joined to the first illumination unit or the second illumination unit, wherein when the rotating cylinder rotates, the first cam and the second cam rotates to move the push rods so as to change the angle of the first illumination unit and the axis and the angle of the second illumination unit and the axis.

13. The illumination system as claimed in claim 12, further comprising a projection adjusting module joined to the first illumination units and changing the distance from the first reflector to the first light source to change the projection pattern, wherein the projection adjusting module comprises:

a plurality of rods with one end fixed to the housing;

a plurality of blocks fixed to the push rods and sliding on the rods; and a plurality of elastic elements disposed on the rods to bias the blocks, whereby the push rods are maintained to abut or engage with the first cam and the second cam.

14. The illumination system as claimed in claim 13, wherein the first illumination unit further comprises a first shield covering the first reflector, the third reflector and the first light source disposed on the first shield; the second illumination unit further comprises a second shield covering the second reflector, the fourth reflector and the second light source, and the second reflector and the second light source are disposed on the second shield.

15. The illumination system as claimed in claim 14, wherein the second shield comprises a longitudinal groove and a traverse groove, and the other end of the push rod slidably engages the longitudinal groove, and the other end of the rod slidably engages the traverse groove, and wherein the longitudinal groove is perpendicular to the movement of the push rod.

16. The illumination system as claimed in claim 15, wherein the traverse groove is curved, and when the push rod moves to push an edge of the longitudinal groove, the second shield is moved by the engagement of the rod and the traverse groove so as to change the distance of the second illumination unit and the axis.

17. An illumination system, comprising:

a first illumination module comprising a plurality of first illumination units corresponding to an axis, wherein each first illumination unit comprises at least one first light source, at least one first reflector and at least one third reflector, arranged such that light beams from the first light source are reflected by the first reflector and/or the third reflector to generate a first projection pattern, and the light beams are concentrated on a first focus located on the axis, the first projection pattern is changed by changing the distance from the first reflector to the first light source by movement of the first reflector, and the position of the first focus is changed by changing the angle between the first illumination unit and the axis;

a second illumination module comprising a plurality of second illumination units corresponding to the axis, wherein each second illumination unit comprises at least one second light source, at least one second reflector and at least one fourth reflector, and wherein light beams from the second light source are reflected by the second reflector and/or the fourth reflector to generate a second projection pattern combined with the first projection pattern to form a projection pattern, the light beams are concentrated on a second focus located on the axis, the position of the second focus is changed by changing the angle between the second illumination unit and the axis;

a focus adjusting module joined to the first illumination units and the second illumination units and changing the angle between the first illumination units and the axis and the angle between the second illumination units and the axis, whereby the positions of the first focus and the second focus are changed, wherein the focus adjusting module comprises:

a rotating cylinder rotating about the axis;

a first cam formed on the periphery of the rotating cylinder; having a plurality of first groove and corresponding to the first illumination units; and a second cam formed on the periphery of the rotating cylinder, having a plurality of second groove and corresponding to the second illumination units; and a plurality of push rods with one end having a guiding element slidably engaging with the first groove or the second groove and the other end joined to the first illumination unit or the second illumination unit, wherein when the rotating cylinder rotates, the first cam and the second cam rotates to move the push rods so as to change the angle of the first illumination unit and the axis and the angle of the second illumination unit and the axis; and a housing surrounding the focus adjusting module.

18. The illumination system as claimed in claim 17, further comprising a projection adjusting module joined to the first illumination units, surrounded by the housing, and changing the distance from the first reflector to the first light source to change the projection pattern, wherein the projection adjusting module further comprises:

a plurality of rods with one end fixed to the housing; and a plurality of blocks fixed to the push rods and sliding on the rods.

* * * * *